Jan. 9, 1962     G. M. WANINGER     3,016,509
MULTI-POLAR TERMINAL CONNECTION FOR ELECTRIC CONDUCTORS
Original Filed Feb. 18, 1955     2 Sheets-Sheet 1

INVENTOR.
Gilbert M. Waninger
BY
Patent Agent

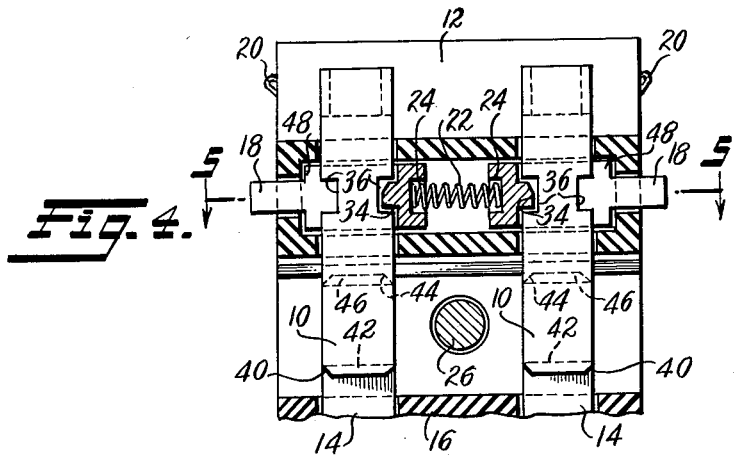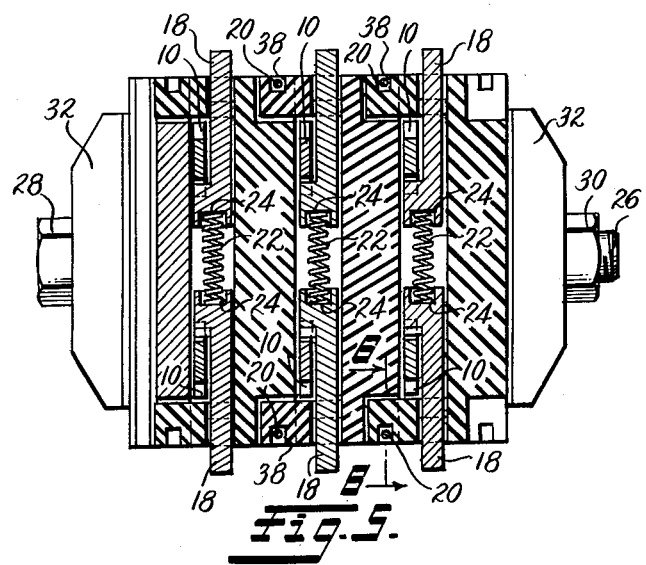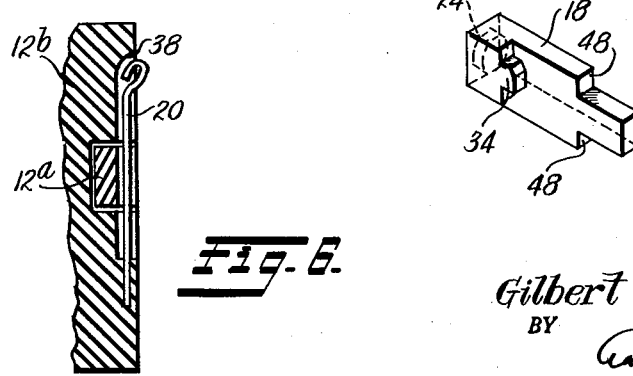

United States Patent Office 3,016,509
Patented Jan. 9, 1962

3,016,509
MULTI-POLAR TERMINAL CONNECTION FOR ELECTRIC CONDUCTORS
Gilbert M. Waninger, Siegen, Westphalia, Germany, assignor to Kabelschlepp G.m.b.H., Siegen, Westphalia, Germany
Original application Feb. 18, 1955, Ser. No. 489,139, now Patent No. 2,945,201, dated July 12, 1960. Divided and this application Mar. 23, 1960, Ser. No. 17,009
Claims priority, application Germany Feb. 20, 1954
6 Claims. (Cl. 339—49)

The present invention relates to terminal electrical connections and, more particularly, to multi-polar terminal connections for electrical conductors.

This application is a division of my application Serial No. 489,139, filed February 18, 1955, now Patent No. 2,945,201.

The connection of electric circuits is effected mostly by means of terminal strips and the like if such connections are not disconnected, or only seldom disconnected during operation, whereas connections which are frequently to be disconnected are effected by means of plug-socket connections or the like. When a greater number of conductors are involved which convey higher currents but have to be disconnected from time to time as for instance in connection with installing, dismantling, repairing or switching over of machines, switches or the like as for instance is frequently the case in the motor car industry or in the machine tool industry, where numerous terminal connections have to be disconnected individually and have to be restored individually. This work requires considerable time and careful attention if faulty connections are to be avoid. Disconnectable plug-socket connections have the drawback that the contact pressure is not properly controlled so that this type of connecting means is not employed any longer for high currents.

It is, therefore, an object of the present invention to provide terminal connections for electrical circuits which will overcome the above mentioned drawbacks.

It is another object of this invention to provide terminal connections for electric circuits which will combine the advantageous properties of terminal strips and plug-socket connections while eliminating the drawbacks thereof.

It is still another object of this invention to provide a multi-polar terminal connection for electric circuits which will make it possible within a short time, and without the danger of effecting faulty connections, simultaneously to disconnect and connect a number of electric conductors in a voltage-free condition while assuring a proper and safe current passage between the respective terminals.

These and other objects and advantages of the invention will appear more clearly from the following specification in connection with the accompanying drawings in which:

FIG. 4 is a transverse section taken along line 4—4 of FIG. 2.

FIG. 5 is a horizontal sectional view taken along line 5—5 of FIG. 4.

FIG. 6 is a vertical sectional view taken along line 6—6 of FIG. 5.

FIG. 7 is a view in perspective of a locking slide element.

General arrangement

Figure 1:
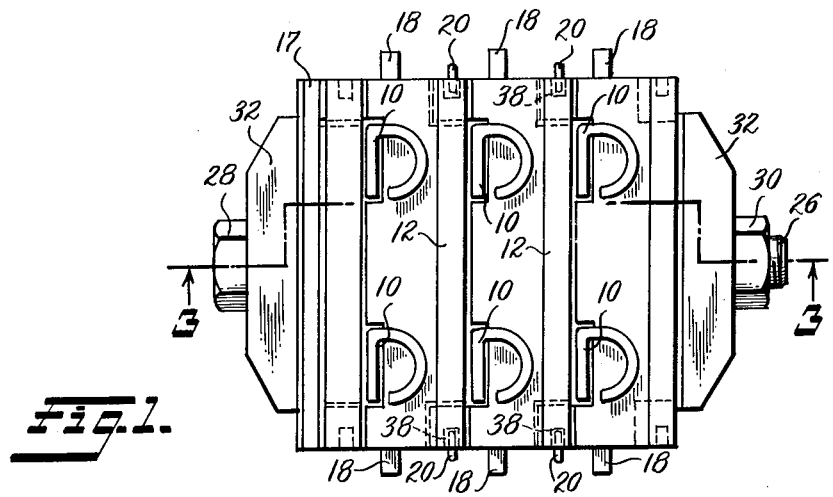
FIG. 1 is a plan view of a multi-polar two-row plug and socket arrangement according to the present invention.

It is a primary feature of the present invention that the individual contact members connected to the respective conductors are arranged between movable insulating members with such play that the said individual contact members can be connected practically without any mechanical resistance, although all contact members can be simultaneously pressed together by means of a single clamping means. The insulating members may consist of heat resistant insulating plastic material which is permanently hardenable. Thermoplastic material is not suitable for the insulating members of the present invention.

The parts may for instance be arranged one alongside the other, but they may also form the mantle of a cylinder. In both instances one row and multiple row contact groups may be formed. It is also possible to mount the contact members in two casing portions which are simultaneously held together by the clamping member, for instance by means of caps or the like.

According to a further feature of the invention, locking means or the like may be provided in order to arrest the inserted contact members in their respective positions so that following the first installation they cannot by themselves drop out.

Structural arrangement

Referring now to the drawings in detail, FIGS. 1 to 5 illustrate a plug and socket type electric connection arrangement. In this embodiment the device consists mainly of two parts, namely an upper part hereinafter referred to as a socket part and a lower part hereinafter referred to as a plug part. For purposes of illustration the plug part is shown in part, the socket part in full. It will be understood that the plug part will in most or all material respects follow the general design of the socket part, but need not necessarily constitute an exact duplicate of the socket part. Both parts are composed essentially of a plurality of electric contact members, separated by interpositioned insulating members. The contact members 10 designed to be connected at one end to electric conductors (not shown) are each provided at the other end with a chamfer or sloping edge 42 and bevelled corners 40 to facilitate assembly. The contact members 10 operatively engage the locking slide elements 18 and move the latter aside during assembly of the electric contact members 10 in the socket part. Similarly the plug part is composed essentially of a plurality of electric contact members 14, separated by interpositioned insulating members 16. The contact members 14 are also provided with a chamfer or sloping edge 46 and bevelled corners 44 to in like manner facilitate assembly and to open the locking slide elements 18 associated with the plug part.

For the purpose of retaining the several insulating members 12 in aligned position there are provided spring clips 20 which are removably inserted in grooves 38. The insulating members 12 are formed with interengaging portions 12a and 12b as particularly shown in FIGS. 2 and 6 which prevent lateral displacement of the insulating members with respect to one another. The interengaging portions are loosely locked together by means of said pin or spring clips 20 inserted therethrough. The interengaging portions constitute integral parts of the insulating members.

After being fully inserted, the electrical contact members are retained in position by means of locking slide elements 18 the relation of which with respect to the electric contact members will be clearly understood by reference to FIG. 4. These locking slide elements are held in normal position by helical compression springs 22 as shown in FIGS. 4 and 5 to the extent that shoulders 48 on the slide elements are brought to bear against the insulating members. Each locking slide element is provided with a shallow recess 24 within which spring 22 is received and supported and with a latch 34 adapted to enter corresponding notches 36 in the electric contact members.

Figure 2:
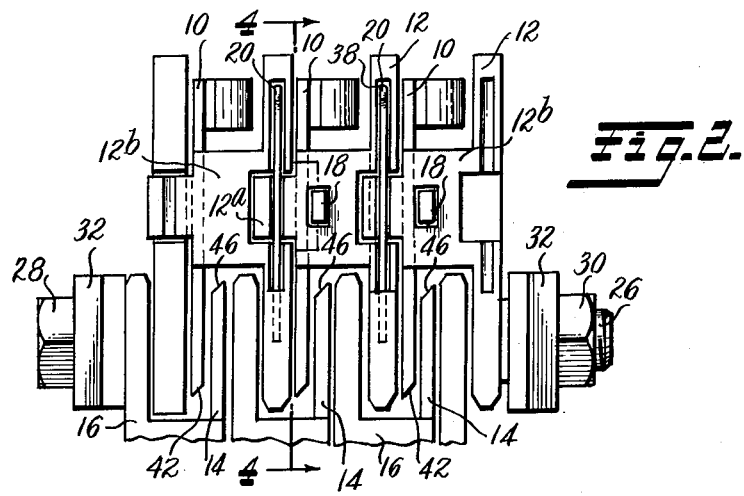
FIG. 2 is a view in elevation of the plug and socket arrangement shown in FIG. 1.
Figure 3:
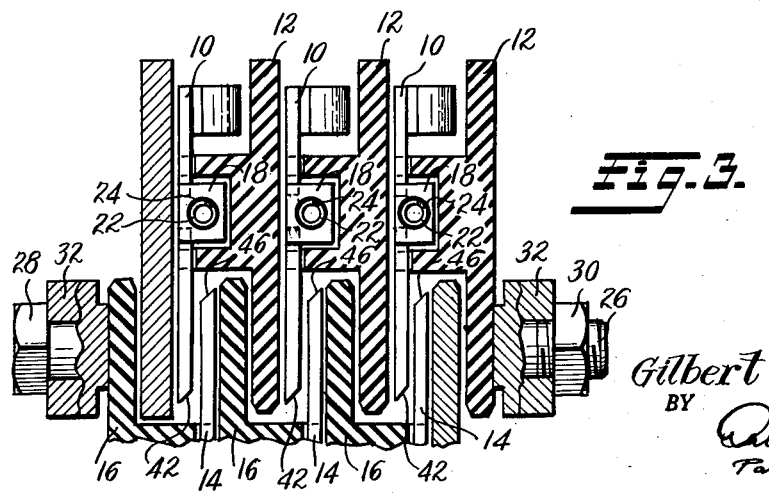
FIG. 3 represents a vertical section taken along line 3—3 of FIG. 1.

After assembly of the elements of the socket part and of the plug part the parts may be joined in the manner shown in FIGS. 2 and 3 and secured in place by means of bolt 26 passed entirely through the socket and plug parts and through the clamping members 32 and secured by head 28 and nut 30.

By means of the above described device the operation of joining electric cable terminals may be effected as follows: The contact members 10 and 14 may be attached to the electrical conductors such as wires or cables by conventional means such as soldering or clamping. If now a reassembly of the circuits is desired, the nut 30 is loosened, the bolt completely removed, and the plug and socket parts separated. The individual components of the plug and socket parts respectively however will not become disoriented or separated. If now it is desired to replace an insulating separator the corresponding pin 20 may be removed. More frequently it will be desired merely to substitute circuit terminals, which may be effected by removing the electric contact members 12 or 14 and inserting other similar contact members attached to the terminals of the circuit which is to be incorporated. For this latter purpose the operator presses inwardly on the protruding portions (FIGS. 4 and 5) of the locking slide elements 18 overcoming the force of spring or springs 22, and unlocking such of the electric contact members 10 and 14 as it is intended to remove. By this inward movement the latch 34 or latches are retracted from the corresponding notches 36 in the electric contact members thereby permitting the latter to be withdrawn from the assembly without disturbing the remainder of the assembly.

The replacement contact members are then appropriately inserted, the locking slide elements meantime having been released and returned to normal position. As each inserted contact member 10 is moved downwardly the bevelled edges thereof will engage the latch 34 forcing same inwardly against the pressure of spring 22 until the latch engages and drops into the notch 36 whereupon the electrical contact member will be held loosely but securely in place. Removal and replacement of insulating and contact members may be effected in like manner in the lower or plug part of the device. It will be appreciated in that it is of very considerable advantage that the disassembly and assembly of the component parts of the plug and socket respectively may be accomplished in a positive manner without necessity for attempting to maintain the elements in their proper respective positions by hand. When now the plug and socket arrangements according to the present invention are assembled the tendency for the elements to fall apart or become displaced will be obviated and create no difficulty.

Upon joining the plug and socket parts of the device suitable clamping means such as bolt 26 will serve to bring the conducting surfaces of the contact members 12 and 14 into firm contact.

While in order to illustrate the invention there has been illustrated an embodiment employing only a triple pair of contact members with a like number of insulating separators, it will be clear that a greater or less number of contact members may be assembled in the manner shown. It should also be noted in this connection that the main operating parts are interchangeable. Also while the insulating members may be formed from comparatively hard material having no special elastic properties, it may in some cases be considered desirable to build in a certain amount of elasticity either in the insulator elements themselves or by means of yieldable intermediate layers.

Other modifications and improvements may be made without departing from the concept of the invention or the scope of the subjoined claims.

What I claim is:

1. In a plug and socket type electric connection device comprising two joinable members of electrical insulating material, each of said members being provided with at least one row of flat electric contact blades respectively separated by interpositioned portions of said joinable members, all of said contact blades in said row being positioned with their faces parallel, each of said contact blades being provided with a notch, a locking slide element carried by each said joinable member for each contact blade thereof releasably engageable with the said notch in the pertaining blade for retaining said contact blades in proper relative position, and clamping means releasably engaging said two joinable members and for clamping together the respective contact blades of said joinable members in firm contact in a direction substantially normal to the faces thereof.

2. In a plug and socket type electric connection device comprising two joinable members of electrical insulating material, each of said members being provided with at least one row of flat electric contact blades respectively separated by interpositioned portions of the pertaining one of said members, all of said contact blades in said row being positioned with their faces parallel, each of said contact blades having at least one lateral edge thereof provided with a notch, a locking slide element carried by each said joinable member for each contact blade thereof releasably engageable with said notch thereof for retaining said contact blades in proper position, and clamping means releasably engaging said two joinable members and for clamping together the respective contact blades of said joinable members in firm contact in a direction substantially normal to the faces thereof.

3. In a plug and socket type electric connection device comprising two joinable members of electrical insulating material, each of said members being provided with at least one row of flat electric contact blades respectively separated by interpositioned portions of the pertaining one of said members, all of said contact blades in said row being positioned with their faces parallel, each of said contact blades being provided with a notch, a retractable locking slide element carried by each said joinable member for each contact blade thereof releasably engageable with said notch thereof for retaining said contact blades in proper position, said contact blades being provided with bevelled corners at the terminal ends thereof for engaging and automatically moving said locking slide elements into retracted position during insertion of said contact blades between adjacent insulating members, and clamping means for releasably engaging said two joinable members and for clamping together the respective contact blades of said joinable members in firm contact in a direction substantially normal to the faces thereof.

4. In a plug and socket type electric connection device comprising two joinable members of electrical insulating material, each of said members being provided with at least one row of flat electric contact blades respectively separated by interpositioned portions of the pertaining one of said members, all of said contact blades in said row being positioned with their faces parallel, each of said contact blades being provided with a notch, a spring biased locking slide element carried by each joinable member for each contact blade thereof releasably engageable with said notch of the pertaining blade for retaining said contact blades in proper relative position, and clamping means for releasably engaging said two joinable members and clamping together the respective contact blades of said joinable members in firm contact in a direction substantially normal to the faces thereof.

5. A plug and socket type electrical connection device according to claim 4 in which each said joinable member is constructed of separable parts, each said part carrying a contact blade and the pertaining locking slide element, and means releasably interconnecting said separable parts of each joinable member for ready assembly and disassembly thereof.

6. A plug and socket type electrical connection device according to claim 5 in which said means releasably interconnecting said separable parts comprises interengaging portions of adjacent ones of said separable parts and a removable pin means engaging the said interengaging portions of each pair of adjacent separable parts.

References Cited in the file of this patent

UNITED STATES PATENTS

| | | |
|---|---|---|
| 1,865,600 | Welch | July 5, 1932 |
| 2,638,574 | Webb | May 12, 1953 |
| 2,750,572 | Fox | June 12, 1956 |

FOREIGN PATENTS

| | | |
|---|---|---|
| 702,778 | Germany | Feb. 15, 1941 |